United States Patent [19]

Onodera et al.

[11] Patent Number: 4,999,558
[45] Date of Patent: Mar. 12, 1991

[54] POSITION CONTROL SYSTEM

[75] Inventors: Hiromi Onodera, Nara; Toshio Inaji, Minou; Tsukasa Yoshiura, Katano; Noriaki Wakabayashi, Hirakata; Hiroshi Mitani, Daito; Mitsuo Tokura, Kadoma, all of Japan

[73] Assignee: Matsushita Electric Industrial Co., Ltd., Osaka, Japan

[21] Appl. No.: 277,198

[22] Filed: Nov. 29, 1988

[30] Foreign Application Priority Data

Dec. 1, 1987 [JP] Japan ................................ 62-305051

[51] Int. Cl.⁵ ............................................. G05B 19/40
[52] U.S. Cl. .................... 318/685; 318/696; 360/77.11; 346/75
[58] Field of Search ............................... 318/685, 696; 360/77.11; 346/75

[56] References Cited

U.S. PATENT DOCUMENTS 3,612,976 10/1971 Tripp .
4,027,310 3/1977 Baker et al. ........................... 346/75
4,255,693 3/1981 Keidl ..................... 318/685
4,630,144 12/1986 Kutaragi ...................... 360/77.11

FOREIGN PATENT DOCUMENTS 2254056 7/1975 France .
2000612 1/1979 United Kingdom .

Primary Examiner—William M. Shoop, Jr.
Assistant Examiner—Saul M. Bergmann
Attorney, Agent, or Firm—Wenderoth, Lind & Ponack

[57] ABSTRACT

A position control system is disclosed for positioning a stepping motor to a target position according to a closed loop control system. The closed loop control system controls the position of the stepping motor according to a current position signal outputted from an encoder operatively coupled to the stepping motor. Furthermore, circuitry is provided for correcting electrically a torque angle error of the stepping motor caused by a positional error between the stepping motor and the encoder due to a mechanical mounting error of the encoder, to thereby drive the stepping motor at a torque angle maintained at the most desirable range.

22 Claims, 11 Drawing Sheets

POSITION CONTROL SYSTEM

BACKGROUND OF THE INVENTION

1. Field of the Invention

The present invention relates to a position control system for controlling a position of an object using a stepping motor as a driving source, and more particularly, to a position control system for controlling a stepping motor according to a closed loop position control system.

2. Description of the Prior Art

In recent years, there have been significant improvements in the performance of various types of information apparatus. Consequently, there is a demand for a position controlling system having a higher speed and a higher precision in the power supply of the magnetic disc apparatus, printer, and other types of devices.

Heretofore, as a power supply for these types of apparatus, a stepping motor has been widely used, and a system of open-loop control has generally been adopted. The open-loop control system has an advantage in the simplicity of a corresponding control circuit, but, on the other hand, due to the constant risk of pulling out of the stepping motor, it is difficult to run it at a high speed. Another point is that, in stopping for position setting, the system is vibrated centering on the stopping point, and time is required for setting. Further, there is a limit in the accuracy of the position setting. It is well known that there are various difficult problems as mentioned above in realizing a high speed, high precision position setting system.

In the conventional position control system using a stepping motor, there has been required a step of delicately adjusting the phases of the polyphase signals and the mechanical angle of the stepping motor at a certain basic position of the stepping motor. Thus, there has been a problem of significant lowering of the mass productivity of the position control system.

SUMMARY OF THE INVENTION

It is the principal object of the present invention to provide a position control system which is operable at a high speed with good precision, and which has a high reliability and excellent mass productivity. A further object of the present invention is to provide a position control system capable of accurately correcting electrically a torque angle error of the stepping motor caused by a positional error between the stepping motor and an encoder for detecting the current position of the stepping motor due to a mechanical mounting error of the encoder, and efficiently driving with good efficiency the stepping motor at a torque angle of the most desirable range.

In order to realize these objects, the position control system of the present invention includes: a stepping motor; an encoder for generating polyphase signals having different phases from one another according to a rotation of the stepping motor; an electronic scale part for producing from the polyphase signals a current position signal indicative of a current rotational position of the stepping motor; a first reference position generator for generating an open loop reference position command for subjecting the stepping motor to an open loop position control; a second reference position generator for generating a closed loop reference position command for subjecting the stepping motor to a closed loop position control; a subtraction part for calculating a difference between the closed loop reference position command and the current position signal and for outputting an error signal indicative of the thus calculated difference; an operating electric angle calculating part for subjecting the error signal to a compensation calculation for the closed loop position control to generate an operating electric angle signal indicative of a torque angle of the stepping motor; an angle adjusting part for generating an angle adjusting signal proportional to a torque angle error caused by a positional error between the stepping motor and the encoder; a control signal generating part for generating a control signal from the operating electric angle signal, the current position signal, and the angle adjusting signal under the closed loop position control, and from the open loop reference position command under the open loop position control; a current command generating part for generating current commands indicative of polyphase currents corresponding to predetermined functions dependant on the control signals; and, a driving part responsive to the current commands for generating the polyphase currents and supplying the polyphase currents to the stepping motor to drive the stepping motor.

Preferably, the position control system of the present invention may be so configured that the angle adjusting signal is automatically detected with the angle adjusting part by subjecting the stepping motor to reciprocal movement under the open loop position control.

According to the above configuration of the position control system of the present invention, the current position of the stepping motor is at all times detected using an encoder and an electronic scale part and the detected value is fed back to the control system so as to constitute a closed loop position control system. Accordingly, there is no case of pull-out even under a transitional condition. In comparison with the conventional case of using a stepping motor under the open loop position control, it is possible in the present invention system to exhibit sufficiently the performance of the stepping motor, so that a high speed, a highly reliable position controlling system can be realized. Further, by conducting a differential compensation with an operating electric angle calculating part, electric damping can be provided to the stepping motor, so that the stepping motor can be quickly set to a reference position under suppression of vibration to a highest possible degree, and a quick response necessitated in the position control system is obtainable. Further, as the control system is operated to reduce the steady-state deviation generated between the command position and the current position to naught by the compensate integral held by the operating electric angle calculating part, it is possible to realize a position control system having a high position setting accuracy. Moreover, as the position control system of the present invention adopts a system which adjusts a torque angle error of the stepping motor caused by a positional error between the stepping motor and the encoder by using an angle adjusting signal, it is possible to drive the stepping motor efficiently at all times at the torque angle of the most desirable range and to operate the system at a high speed. Further, as it is possible to omit a delicate mechanical adjusting step for adjusting a torque angle error of the stepping motor caused by a positional error of the encoder relative to the stepping motor, it can contribute greatly to an improvement in productivity.

Accordingly, the present invention can provide a position control system of high speed, high precision, high reliability and high mass productivity, while solving the conventional problems.

DESCRIPTION OF THE PREFERRED EMBODIMENTS

Figure 1:
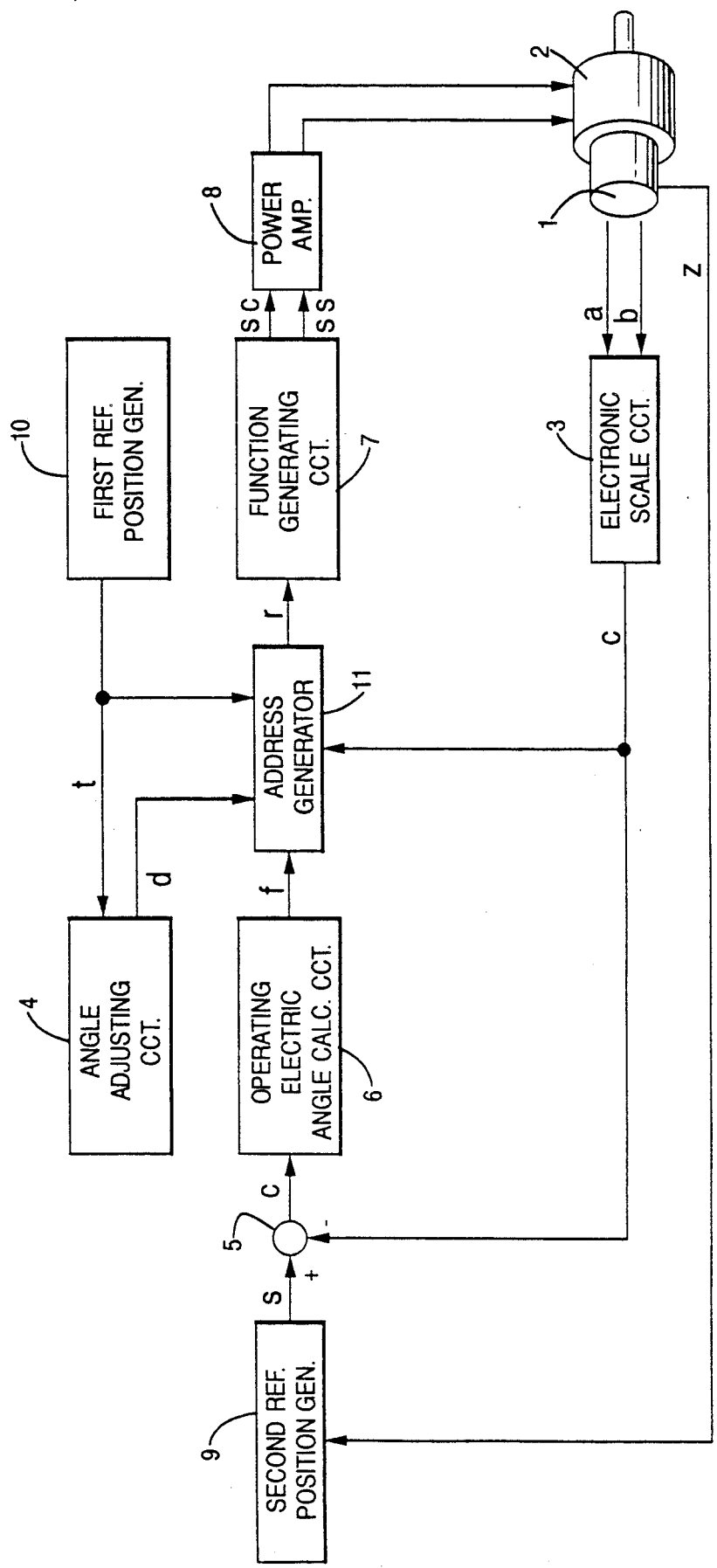
FIG. 1 is a block diagram of the position control system in a first embodiment of the present invention.

Preferred embodiments of the position control system of the present invention will be described hereinafter with reference to the drawings. In the following description, the signals and the values representing the signals are described using the same reference characters.

FIG. 1 is a block diagram showing the entire configuration of the first embodiment of the position control system of the present invention. In FIG. 1, the motor 2 is a rotary stepping motor, for which a two-phase motor is used in the present embodiment. An incrementary type encoder 1 is fixed to a rotary shaft of the stepping motor 2, and outputs 2-phase sine wave-like position signals a and b which are different in phase from each other by 90° according to its rotation and a basic position signal z to show a basic position. The electronic scale circuit 3 produces a current position signal c which is linearly proportionate to the amount of deviation in rotation from the basic position according to the sine wave-like position signals a and b. A subtracter 5 calculates a difference between a closed loop reference position provided by a second reference position generator 9 and the current position signal c to output an error signal e ($=s-c$). The operating electric angle calculation circuit 6 conducts integral and differential compensations, etc. to the error signal e to produce an operating electric angle signal f. The first reference position generator 10 generates an open loop position command t for subjecting the stepping motor 2 to open loop position control. An angle adjusting circuit 4 outputs an angle adjusting signal d corresponding to a torque angle error caused by a positional error between the stepping motor 2 and the encoder 1. An address generator 11 outputs, during the closed loop position control, an address signal r according to the inputs thereto of the operating electric angle signal f, the current position signal c, and the angle adjusting signal d, and, during the open loop position control, an address signal r according to the input thereto of the open loop reference position command t. A function generating circuit 7 calculates micro-step current commands sc and ss indicative of 2-phase currents to be supplied to the stepping motor 2 pursuant to certain functions (in this embodiment, sine wave and cosine wave, respectively) according to the address r. The 2-phase micro-step current commands sc and ss are amplified by the power amplifier 8 and supplied to the stepping motor 2.

In the position control system of the present invention, it is necessary to initialize, at the time of power start-up, the electronic scale circuit 3 and the second reference position generator 9 in which the values therein are apt to become unstable (to be referred to as initialization of the system). In initializing the system, firstly the open loop reference position command t is time-proportionally varied to rotate the stepping motor 2 to the position indicated by the basic position signal z by the open loop control. The first reference position generator 10 realizes the reference position command using a type of counter which shows an increase or decrease in its output value in a certain time cycle. The open loop reference position command t is used for generating the micro-step current commands sc and ss by the address generator 11 and the function generating circuit 7. These micro-step current commands sc and ss are amplified by the power amplifier 8 to rotate the stepping motor 2. Accordingly, the stepping motor 2 is driven stepwise in a certain direction corresponding to the increase of the open loop position command t. Furthermore, when the basic position signal z outputted by the encoder 1 through the rotation of the stepping motor 2 reaches the position of change from "L level" to "H level" (or the position of change from "H level" to "L level"), the first reference position generator 10 stops the increase of the increment counter to fix the amount of the reference position command, and the stepping motor 2 also stops at its position. The angle adjusting circuit 4 receives the open loop position command t outputted from the first reference position generator 10 at that time and outputs the same as the angle adjusting signal d. Further, at this position, the electronic scale circuit 3 and the second reference position generator 9 are respectively initialized (in this embodiment, to be cleared to zero).

As described above, after completion of the processing for initialization, the position control system performs normal closed loop position control. In the closed loop position control, position setting is effected so that the closed loop position command s outputted by the second reference position generator 9 coincides with the current position signal c outputted by the electronic scale circuit 3. The closed loop position command s and the current position signal c are inputted into the subtraction circuit 5 to become an error signal e ($=s-c$). The operating electric angle calculation circuit 6 utilizes the error signal e as an input, provides it with a calculation of differential and integral compensations, and outputs and operating electric angle signal f. Operation of the integral compensation is realized by a primary digital filter having a low frequency high gain characteristic. Operation of the differential compensation realized by a digital filter having q-primary high frequency high gain characteristic and the like. The integral compensation operates in a manner to reduce as much as possible the steady-state deviation produced under the effects of the friction load and the like, and the differential compensation provides electrical damping to the stepping motor 2. Accordingly, the stepping motor 2 can be quickly set to the target position under a condition wherein the vibration is suppressed, and further the position control system is stabilized. In the closed loop position control, the inputs of the address generator 11 are the generated electric angle signal f, current position signal c and angle adjusting signal d, and the outputs are the micro-step current commands sc and ss. These micro-step current commands are amplified by the power amplifier 8 as in the case of the initialization of the system to drive the stepping motor 2.

FIGS. 2 through 5 are drawings for illustrating the configuration of each element of the first embodiment of the present invention shown in FIG. 1. A detailed explanation will be given hereinafter with reference to these drawings.

In the present embodiment, in order to simplify the explanation, a description will be given regarding the case where the scale (=resolution) of the current position signal c and that of the address signal r are identical.

Figure 2:
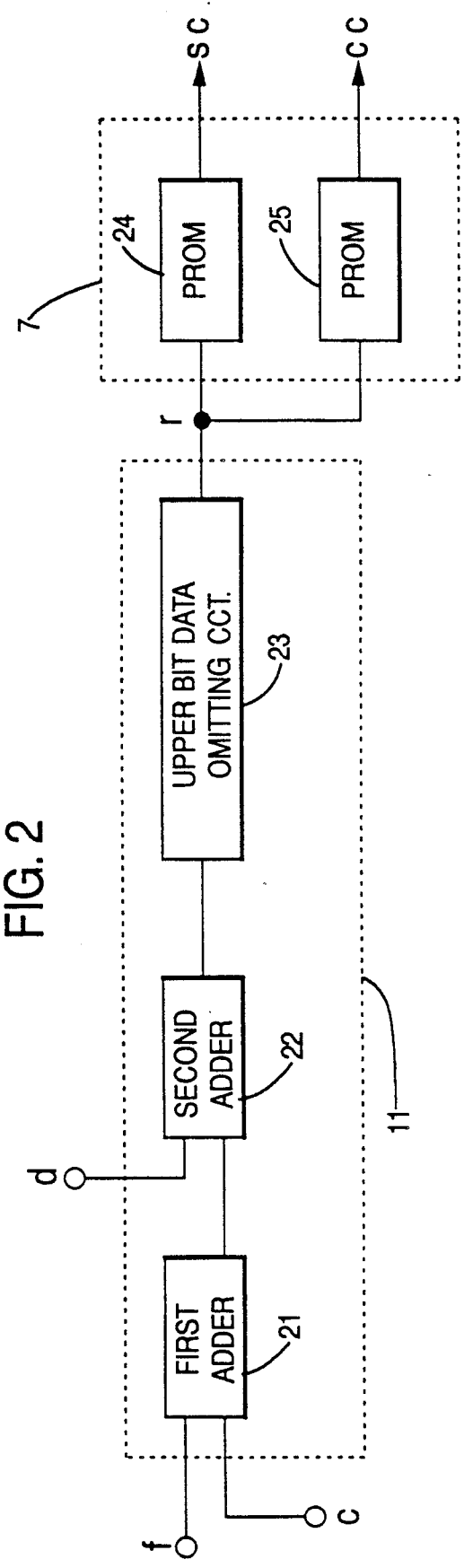
FIG. 2 is a block diagram showing the specific configuration of the address generator and the function generating circuit.

FIG. 2 is a block diagram showing one embodiment of each of the address generator 11 and the function generating circuit 7. ROMs 24 and 25 are each a PROM containing data of current commands for micro-steps each corresponding to the basic one pitch P of the stepping motor 2 following a certain function (in this embodiment, sine waves of mutually different phases at 90°). The means of calculating the address r for these PROMs 24 and 25 are the first adder 21, second adder 22, and upper bit data omitting circuit 23. The first adder 21 performs addition of the current position signal c and the operating electric angle signal f. The second adder 22 performs addition of the output of the first adder 21 and the angle adjusting compensating signal d. The angle adjusting signal d is used to provide a certain offset of the address r to PROMs 24 and 25. That is to say, the phases of the micro-step current commands sc and ss shift by the amount corresponding to d. Consequently, even in the case where the mechanical rotational angle of the stepping motor 2 and the phase of a micro-step current command are deviated from each other to cause a phase difference, the quantity of the angle adjusting signal d is varied in proportion to the phase difference, so that these two factors can be accurately correlated and the stepping motor 2 can be efficiently driven at all times at the torque angle in the most desirable range. The upper bit data omitting circuit 23 is not essentially necessary, because, if the operable range of the stepping motor 2 is within the basic one pitch P from the basic position, the output of the second adder 22 may be used as such as the address r of PROMs 24 and 25. However, when the movable range exceeds the basic one pitch P, the upper bit data omitting circuit 23 is necessary in order to omit the upper bit data for the portion exceeding one pitch of the output of the second adder 22.

Figure 3:
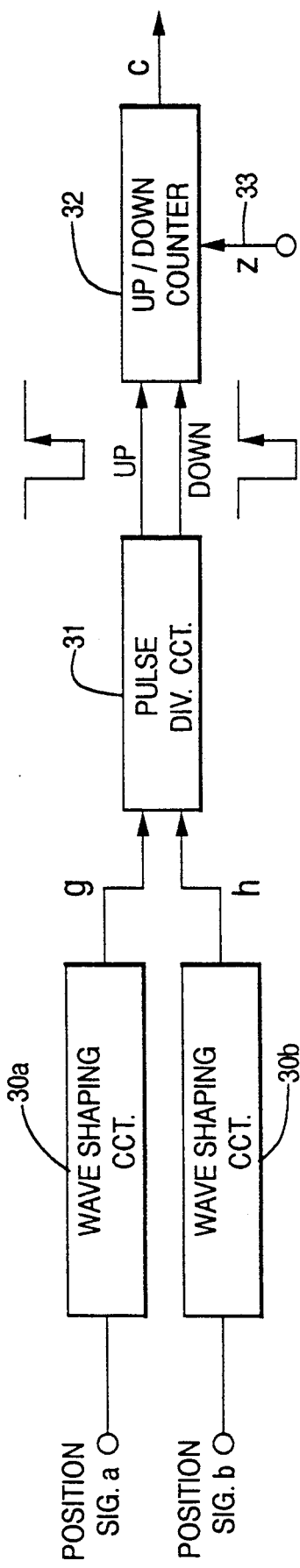
FIG. 3 is a block diagram showing a first embodiment of the electronic scale circuit.

FIG. 3 is a block diagram showing a first embodiment of the electronic scale circuit 3 in the position control system of FIG. 1. The 2-phase sine wave-like position signals a and b from the encoder 1 are converted into the square wave signals g and h respectively by the wave shaping circuits 30a and 30b and inputted into the pulse dividing circuit 31. The square wave signals g and h are separated into an up-count pulse (UP) and down-count pulse (DOWN) by the pulse dividing circuit 31 according to the direction of rotation of the stepping motor 2. By counting them with the up/down counter 32, there can be obtained a current position signal c proportionate to the amount of variation of rotation of the stepping motor 2. However, as the value of the up/down counter 32 is unstable at the initial stage of power input, it is cleared to zero at the basic position by the basic position signal z to be inputted to the initial reset input terminal 33 at the initialization of the system.

In the case of the electronic scale circuit 3 as configured above, because the resolution of the encoder 1 corresponds as such to the resolution of the position, it is necessary to use an encoder 1 having a high resolution in order to effect position control at a high precision.

Figure 4:
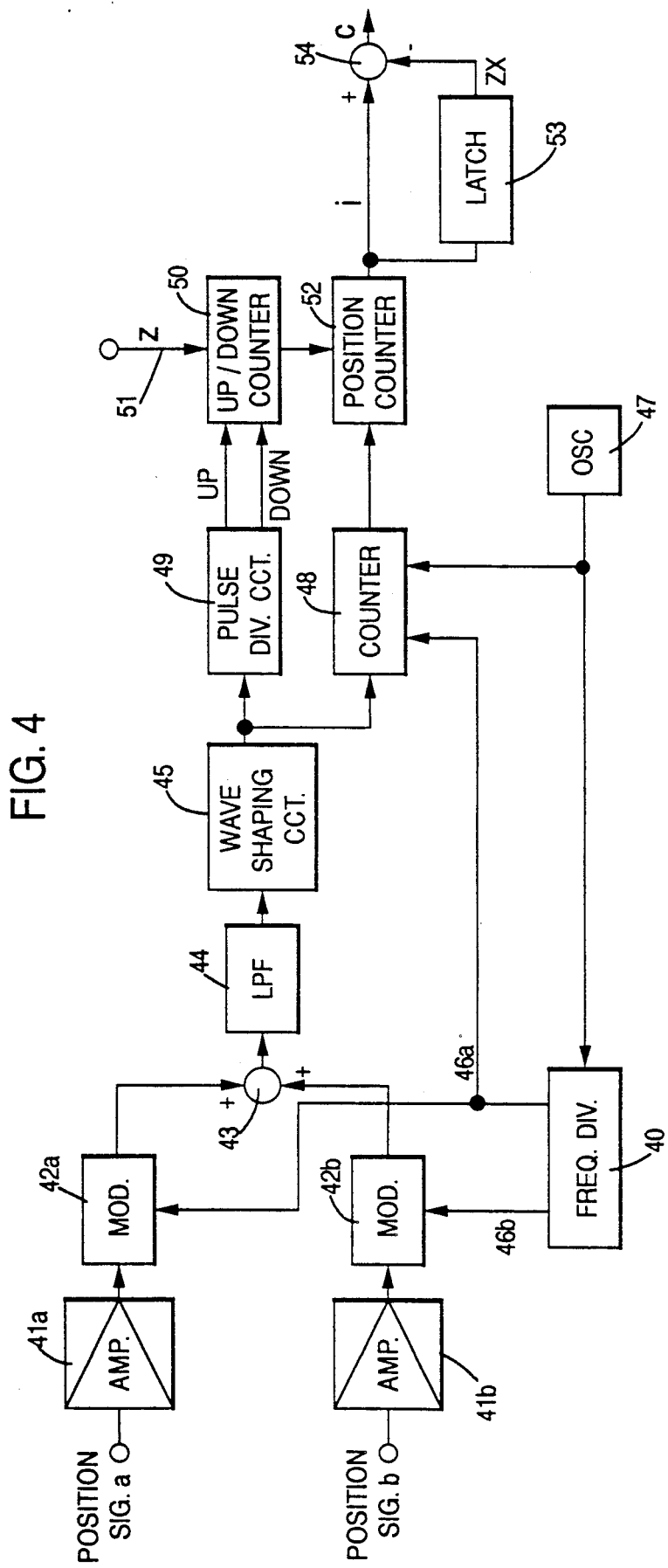
FIG. 4 is a block diagram showing a second embodiment of the electronic scale circuit.

FIG. 4 is a block diagram showing a second embodiment of the electronic scale circuit 3. Amplifiers 41a and 41b are the position signal amplifiers for amplifying the 2-phase sine wave-like position signals a and b respectively outputted by the encoder 1. Modulation circuits 42a and 42b are the types of multipliers for modulating the high frequency carrier signals 46a and 46b respectively with the 2-phase sine wave outputs of the position signal amplifiers 41a and 41b. The carrier signal generator 40 effects frequency division of the reference clock signals 46a and 46b. These two carrier signals 46a and 46b are 90° out of phase to each other, and are inputted to the modulation circuits 42a and 42b from the carrier signal generator 40. The adder 43 adds the modulation outputs of the modulation circuits 42a and 42b. The low pass filter 44 eliminates the harmonic components of the modulation output added by the adder 43 and outputs the fundamental wave component only. The wave shaping circuit 45 converts this fundamental wave into a square wave. Assuming the 2-phase sine wave outputs of the position signal amplifiers 41a and 41b to be EA (Θ) and EB (Θ), respectively, the following expressions can be given:

EA (Θ)=E·COS (2πΘ/Θ$_p$)

EB (Θ)=E·SIN (2πΘ/Θ$_p$)

where, Θ is the rotary angle of the stepping motor 2, Θ$_p$ is 1 cycle pitch of a sine wave to be outputted by the encoder 1, and E is an amplitude of the sine wave position signal.

On the other hand, assuming the carrier signals 46a and 46b to be CA(t) and CB(t), respectively, the following expressions can be obtained:

CA(t)=COS (2πf$_c$t)

CB(t)=SIN (2πf$_c$t)

where, f$_c$ is a carrier frequency.

Assuming the result of addition using the adder 43 the modulation using the modulation circuits 42a and 42b to be P(t,Θ), the following data are obtained:

$$\begin{aligned} P(t,\Theta) &= EA(\Theta) \cdot CA(t) + EB(\Theta) \cdot CB(t) \\ &= E\{\cos(2\pi\Theta/\Theta_p) \cdot \cos(2\pi f_c t) + \\ &\quad \sin(2\pi\Theta/\Theta_p) \cdot \sin(2\pi f_c t)\} \\ &= E\cos(2\pi f_c t - 2\pi\Theta/\Theta_p). \end{aligned}$$

This means that the carrier having the frequency of $f_c$ includes a phase term of $2\pi\Theta/\Theta_p$. In other words, in $P(t,\Theta)$, the position information $\Theta$ is converted into the form of position information. Accordingly, by demodulating the position information $P(t,\Theta)$, the position of the stepping motor 2 can be identified.

Since the signal $P(t,\Theta)$ obtained by addition after modulation cannot be utilized as such, it must be demodulated and the the position information only has to be taken out by separation. In the embodiment of the present invention, there is used a demodulation system such that, after converting the signal $P(t,\Theta)$ into a square wave using the wave shaping circuit 45, the phase deviation of the signal $P(t,\Theta)$ to the carrier signal 46a is directly counted using the reference clock signal outputted by the reference oscillator 47, by which the position information having a high resolution is outputted. The counter 48 is a phase difference counter for counting the phase information of the signal $P(t,\Theta)$. The inputs of the phase difference counter are the carrier signal 46a, the signal $P(t,\Theta)$ converted into a square wave using the wave shaping circuits 45 and the reference clock signal outputted by the oscillator 47. The phase difference counter 48 starts to count the reference clock signal 46a, and continues counting until it detects the rise (or decay) of the signal $P(t,\Theta)$. By such a configuration, it is possible to obtain the phase information $(2\pi\Theta/\Theta_p)$ contained in the signal $P(t,\Theta)$ as a count value of the phase difference counter 48. Further, as the frequency of the carrier signal 46a is $f_c$, by using a reference clock signal having a frequency equal to n times the frequency $f_c$, it becomes possible to measure the phase having a resolution of 1/n to 1 cycle. This means having a resolution of 1/n to the phase $2\pi$, and since the phase $2\pi$ corresponds to 1 cycle pitch $\Theta_p$ of the sine wave position signal outputted by the encoder 1, it means having made 1/n interpolation at equal distance of 1 cycle pitch $\Theta_p$ of the position signal to the angle of rotation. Accordingly, in order to increase the resolution and obtain smooth position information, it may be so set as to make $\Theta_p$ small and n large. The frequency dividing circuit 40 divides the output of the oscillator 47 to 1/n and outputs the 2-phase carrier signals 46a and 46b.

Additionally, the contents of the phase difference counter 48 are n in the maximum, having the phase discriminating capacity only within the range of the 1 cycle pitch $\Theta_p$ of the position signal. Accordingly, in order to effect the operation in such a broad range as is necessitated with the actual position control device possible, an up/down counter 50 is provided to count the number at which the position signal has exceeded the 1 cycle pitch $\Theta_p$. The pulse separating circuit 49 separates the pulse into an up-count pulse and down-count pulse, respectively, according to each change of the content of the phase difference counter 48 to 0→n or n→0. The up/down counter 50 performs the up-count or down-count in response to the up-count pulse or down-count pulse. The terminal 51 is the original point/initial time reset input, in which a basic position signal z showing the basic position is inputted. The position counter 52 synthesizes the content of the up/down counter 50 and the content of the phase difference counter 48 to the upper bit part and the lower bit part, respectively, and outputs the position data i. The subtracter 54 calculates the difference between the position data i provided by the position counter 52 and a certain latch zx provided by the latch 53 and outputs the current position signal c(=i−zx).

An explanation is now given regarding the latch zx. The electronic scale circuit 3 is to be initialized upon initialization of the system, since the value of the position counter 52 becomes unstable after the power input, making it necessary to provide the initial value corresponding to the basic position. However, when an electrical interpolation system as in the embodiment of FIG. 4 is used, it is only the contents of the up/down counter 50 that can be simply initialized (in this embodiment, cleared to zero), and it is not possible to initialize even the contents of the phase difference counter 48 which are the interpolation information in 1 cycle pitch $\Theta_p$ of the sine wave-like positions signals a and b. On the other hand, as the closed loop reference position command s which is the output of the second reference position command s which is the output of the second reference position generator 9 is cleared at the position of the basic position signal z to become zero, a deviation occur between the two. Accordingly, in this embodiment, the value zx of the interpolation counter 48 (=lower bit portion of the position counter 52), at the time when the stepping motor 2 is positioned at the basic position indicated by the basic position signal z, is first memorized in the latch 53. Thereafter, the balance after subtraction of a certain latch zx from the position data i is taken as the current position signal, by which the problem of initialization is solved.

Figure 5:
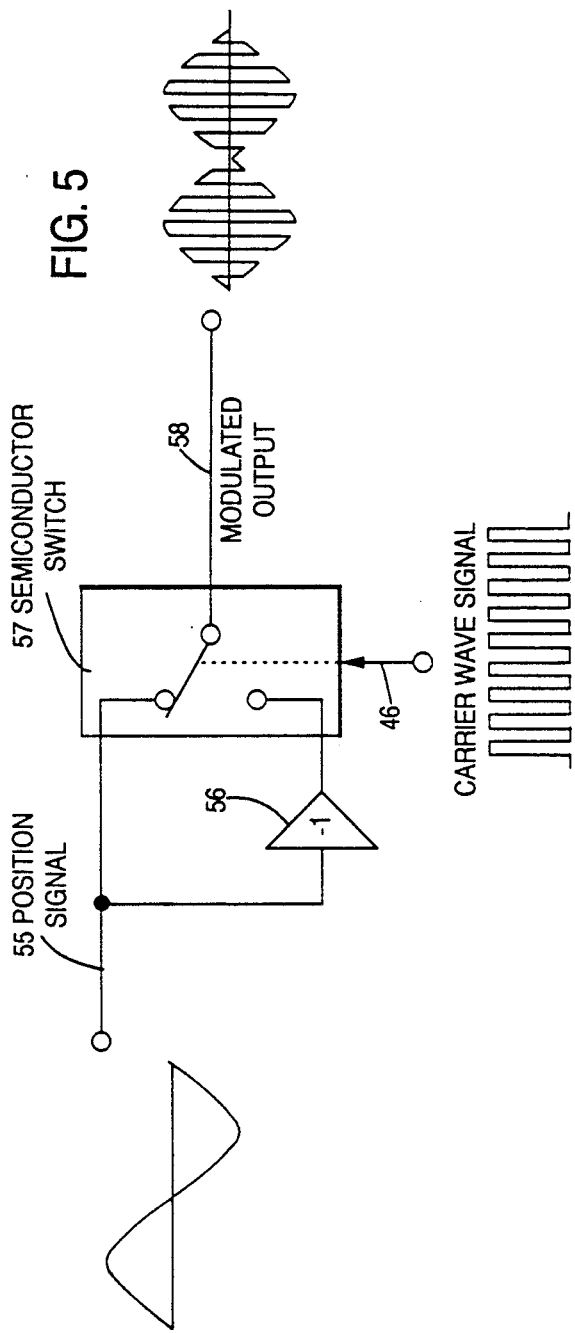
FIG. 5 is a block diagram showing the specific configuration of the modulation circuit to be used in the electronic scale circuit.

FIG. 5 is one embodiment of the modulation circuits 42a and 42b. The signal 55 is a sine wave output $E(\Theta)$ of the position signal amplifier 41a or 41b. The amplifier 56 is an inversing amplifier (gain 1). The switch 57 is a semiconductor switch controlled by the carrier signal (frequency $f_c$) 46. The semiconductor switch 57 is configured so as to transmit the position signal $E(\Theta)$ as such when the carrier signal 46 is at a "H level", and to transmit the inverted position signal $-E(\Theta)$ when the carrier signal 46 is at a "L level", thereby obtaining a modulation output 58 as illustrated.

According to the above configuration, the sine wave-like portion signals a and b are converted into the current position signal c having a high resolution in proportion to the amount of variation of rotation. In general, an encoder having a high resolution is difficult to manufacture and is expensive. However, when such an electrical interpolation circuit is used, sufficiently fine current position signal can readily be obtained from even a relatively low priced encoder having a coarse resolution. Accordingly, it becomes possible to make the step width of the stepping motor 2 finer, and to realize a position control system of a higher precision.

Figure 6:
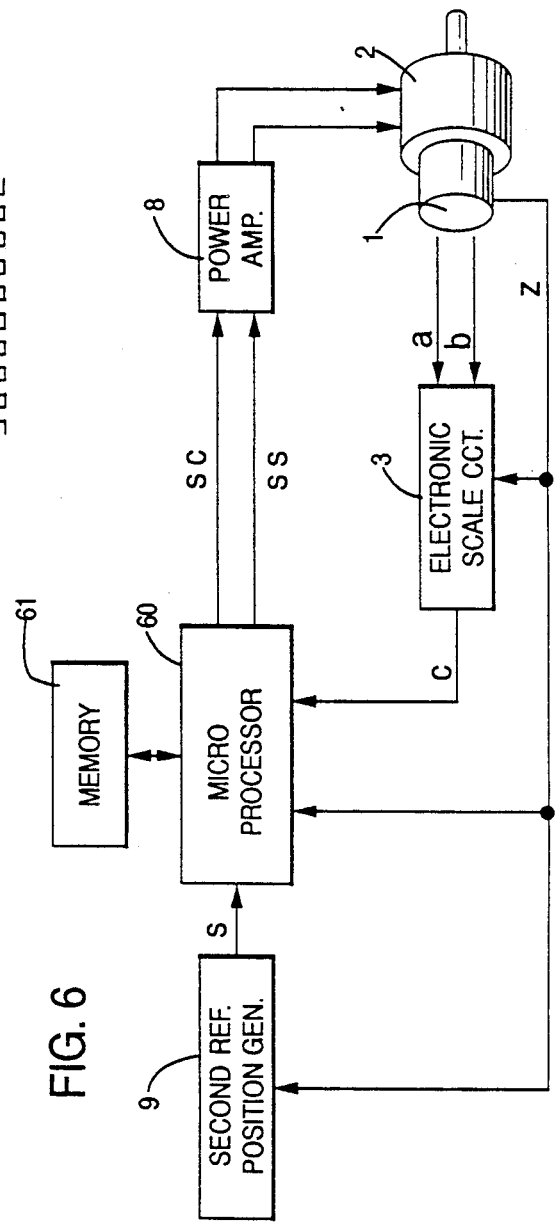
FIG. 6 is a block diagram showing the position control system in a second embodiment of the present invention.

In the above embodiment as shown in FIG. 1, examples were set forth for realizing the difference circuit 5, operating electric angle calculation circuit 6, address generator 11, function generating circuit 7, angle adjusting circuit 44, and the first reference position generator 10 respectively using hardware. Needless to say, however, these elements may be treated like a program by using a computer, thereby making it possible to realize similar function. Also, in the embodiment of the electronic scale circuit 3 as shown in FIG. 4, the latch 53 and the subtraction circuit 54 may conveniently be subjected to program-like treatment. FIG. 6 shows the configuration in such a case.

FIG. 6 is a block diagram of the position control system in the second embodiment of the present invention. With respect to the same elements as those shown in FIG. 1, the same numbers have been assigned and their description omitted. The processing unit 60 employs a micro-processor. The processing unit 60 is operated in accordance with the later described prescribed internal program stored in the ROM range (Read-On-Memory range) of the memory 61.

Hereinafter, an explanation will be given of the internal program stored in the ROM range of the memory 61.

Figure 7:
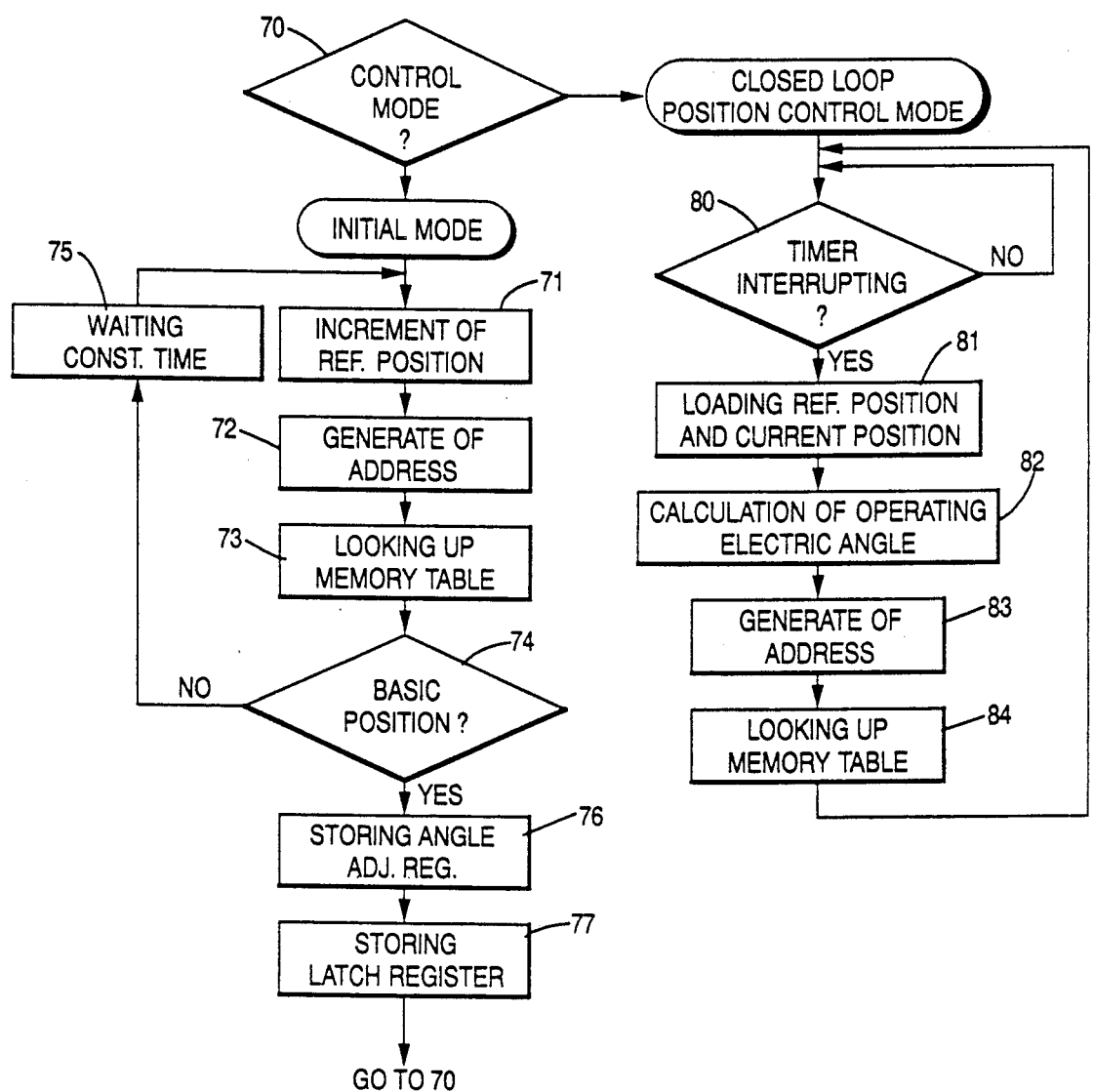
FIG. 7 is a basic operational flow chart of the contained program stored in the memory of FIG. 6.

FIG. 7 shows a basic operation flow chart of this program. The ensuing explanation will be set forth in accordance with this figure, and is limited to the case where the embodiment shown in FIG. 4 is used for the electronic scale circuit 3.

Process step 70 is a confirmatory process step of the operation mode command, in which, for initialization of the system, the operation proceeds to Process step 71, and for normal closed loop position control, to Process step 80, respectively. After the start-up, initialization of the system is first selected.

Process step 71 corresponds to the first reference position generator 10. This is a processing routine for producing an open loop position command t which increases at certain time intervals. Specifically, the content of the open loop reference position command register allocated to a certain address in the RAM range and a constant value k are added, and the result is outputted to the open loop reference position command register. The constant value k at this time corresponds to the step width in driving the stepping motor 2 in open loop stepping.

Process step 72 corresponds to the upper bit data omitting circuit 23 in the address generator 11, in which, of the contents of the open loop reference position command register, the upper bit data of the portion exceeding the basic 1 pitch P of the stepping motor 2 are subjected to omitting, and the result thereof is stored in the address register allocated to the RAM range.

The Process step 73, utilizing the contents of the address register stored in Process step 72 as an address to the memory 61, by referring to the function tables of sine wave and cosine wave which are stored in ROM range of the memory 61, the 2-phase signals sc and ss are obtained, and they are respectively outputted to the driving circuit 8. By this procedure, the stepping motor 2 rotates by 1 step at the stepping width corresponding to a certain value k.

Process step 74 is a process to confirm whether or not the stepping motor 2 has shifted to the position of the basic position signal z. If the shifting has been completed, the operation proceeds to the process step 75, and if not yet completed, after waiting a certain time in process step 75, steps 71 through 74 are repeated. When the stepping motor 2 reaches the position of the basic position signal z, the electronic scale circuit 3 and the second reference position generator 9 are initialized by the basic position signal z.

In Process step 76, the contents of the open loop reference position command register at that time are stored in an angle adjusting signal register allocated to the RAM range as the angle adjusting signal d.

In Process step 77, the position data i, which is the output of the position counter 2 in the electronic scale circuit 3, is outputted and stored in the latch register allocated to the RAM range. This latch is defined as zx.

Processes steps 80 through 84 are the normal closed loop position control mode processes.

Process step 80 waits for an interruption from a timer. The timer generates an interruption signal at intervals of a prescribed time $\Delta T$, and on interruption the operation proceeds to Process step 81. That is to say, the following processing is performed according to the sampling time $\_T$.

Process step 81 includes the subtraction circuit 54. Here, the closed loop reference position command s and the position data i are respectively outputted and stored in the reference position register. Then, the latch zx stored in the latch register in Process step 76 is subtracted from the stored position data i, and the result thereof is stored as the current position signal c in the current position register.

Process step 82 corresponds to the operating electric angle calculation circuit 6. Here, in order to position the stepping motor 2 at the target position, the difference between the content s of the reference position register and the content c of the current position register is calculated to obtain an error signal e ($=s-c$). Further, based on the error signal e, a digital filter operation of integral compensation and differential compensation is conducted to produce an operating electric angle amount f, which is stored in the operating electric angle register allocated to the RAM range.

Process step 83 corresponds to the first adder 21, second adder 22, and upper bit data omitting circuit 23 in the function generating circuit 7. Here, in addition of the data of the current position register and the operating electric angle register is performed, and further the result thereof and the content of the angle adjusting signal memory register are added. Then, of the amount obtained there, the upper bit data of the portion in excess of the basic 1 pitch P of the stepping motor 2 is omitted and the result is stored in the above address register.

In Process step 84, utilizing the contents of the address register stored as an address to the memory 61, by referring to the function tables of sine wave and cosine wave which are stored in ROM range of the memory 61, the 2-phase signals sc and ss are obtained, and they are respectively outputted to the driving circuit 8. After this process, Process steps 80 through 84 are repeatedly executed until a command to shift to a separate mode is provided from an external source.

In the angle adjusting circuits used in the first embodiment and the second embodiment of the position control system as explained above, the simplest torque angle error adjusting system for adjusting a torque error caused by the positional error between the stepping motor and the encoder is used. Although they are effective in the case where the stepping motor or the object to be driven by the stepping motor has a small load (friction load, etc.), when it has a large friction load, there is a possibility of taking in an erroneous angle adjusting signal d. The third embodiment to be next explained is to obviate the above defect, and is a more preferred embodiment.

Figure 8:
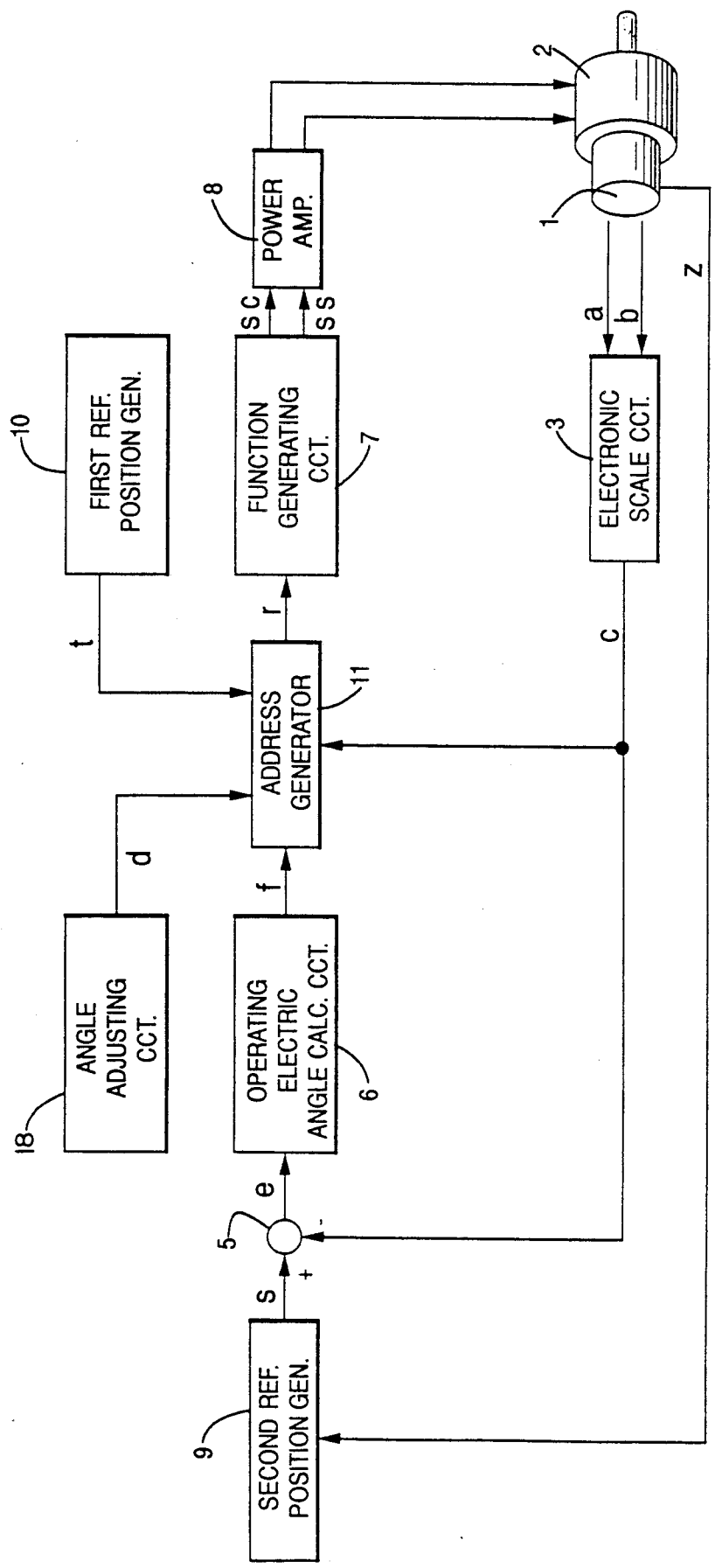
FIG. 8 is a block diagram of the position control system in a third embodiment of the present invention.

FIG. 8 is a block diagram showing the entire configuration of the third embodiment of the position control system according to the present invention. In the present embodiment the point of difference from the first embodiment shown in FIG. 1 is only in the angle adjusting circuit 18, so that the following explanation will be limited to the related part. In the angle adjusting circuit 18 in this embodiment, the output t of the first reference position generator is not used as an angle adjusting signal d, as shown in the drawing. Using another drawing, the angle adjusting circuit in this embodiment will be explained in detail below.

Figure 9:
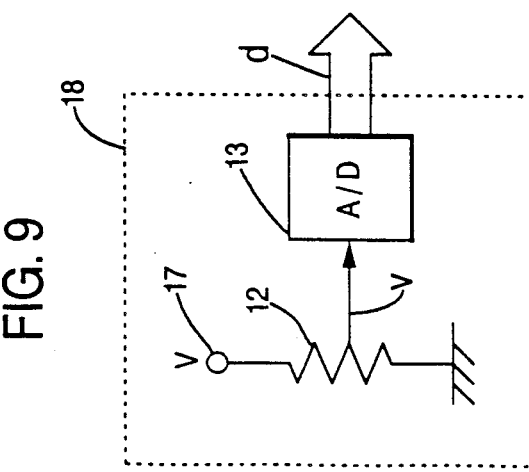
FIG. 9 is a block diagram showing a first embodiment of the angle adjusting circuit in FIG. 8.

FIG. 9 is the first embodiment of the angle adjusting circuit 18 shown in FIG. 8. To the terminal 17 a reference voltage V is inputted. The two ends of the variable resistor 12 are connected to the reference voltage V an to ground. A voltage v is outputted from the other end. An A/D converter 13 effects analog to digital conversion of the voltage v. By adjusting the above voltage v, an angle adjusting signal d is outputted according to the positional error between the stepping motor 2 and the encoder 1.

Here, explanation is given of the angle adjusting signal d. Consideration is now made of the case where, assuming angle adjusting signal d and the quantity of the operating electric angle f to be zero and the position, or rotational angle, of the stepping motor 2 to be X, there is a difference ed between positions of the stepping motor 2 and the encoder 1. In this case, the current position signal c obtained from the encoder 1 becomes: c=X+ed. As this signal becomes the address r in the function generating circuit 7, the stepping motor 2 generates a torque corresponding to the difference ed from the current position X. The angle adjusting circuit 18 is adjusted to make this torque zero, i.e., to make the angle adjusting signal d:d= −ed. Specifically, the variable resistor 12 is adjusted so that the result d of the A/D conversion of the output voltage v becomes −ed. Since the variable resistor 12 is a type of nonvolatile memory, if it is once adjusted, it does not necessitate any adjustment thereafter. If necessary, reference may be made to an angle compensating signal d which is an output of the A/D converter 13.

Figure 10:
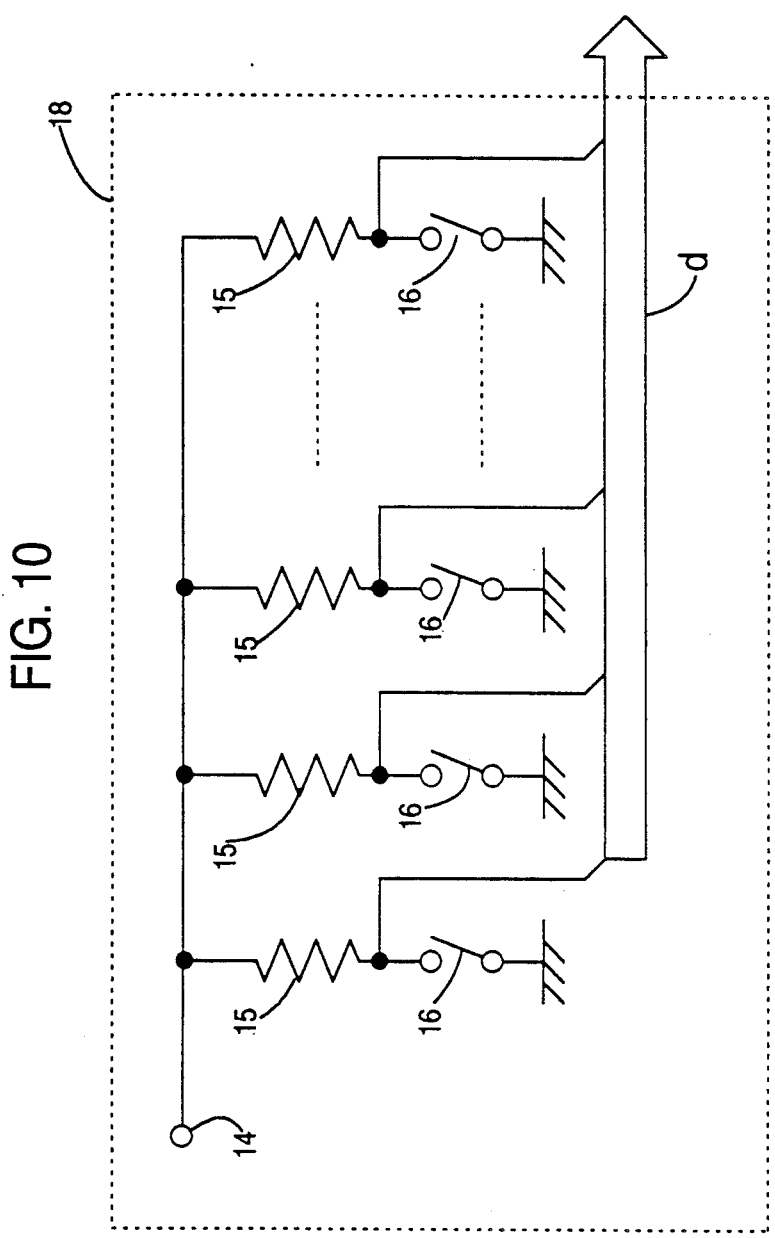
FIG. 10 is a block diagram showing a second embodiment of the angle adjusting circuit in FIG. 8.

FIG. 10 shows a second embodiment of the angle adjusting circuit 18 as shown in FIG. 8, representing one example of the digital code generating circuit. To the terminal 14 the reference voltage V is inputted. Dip switches 16 are provided in moderate number. Fixed resistors 15 are provided in a same number as that of the dip switches 16. The two ends of each fixed resistor are connected to the reference voltage V and to a dip switch 16. From each connecting point between the fixed resistor 15 and the dip switch 16, an angle adjusting signal d corresponding to the torque angle error caused by the positional error between the stepping motor 2 and the encoder 1 is outputted.

Since this angle adjusting signal d has basically the same action as that of the embodiment shown in FIG. 9, detailed explanation thereof is omitted, but adjustment may be made so that the angle adjusting signal d (digital code) to be generated by the setting of the dip switch becomes −ed. In this embodiment as well, if adjustment is first made, no subsequent adjustment is necessary.

Figure 11:
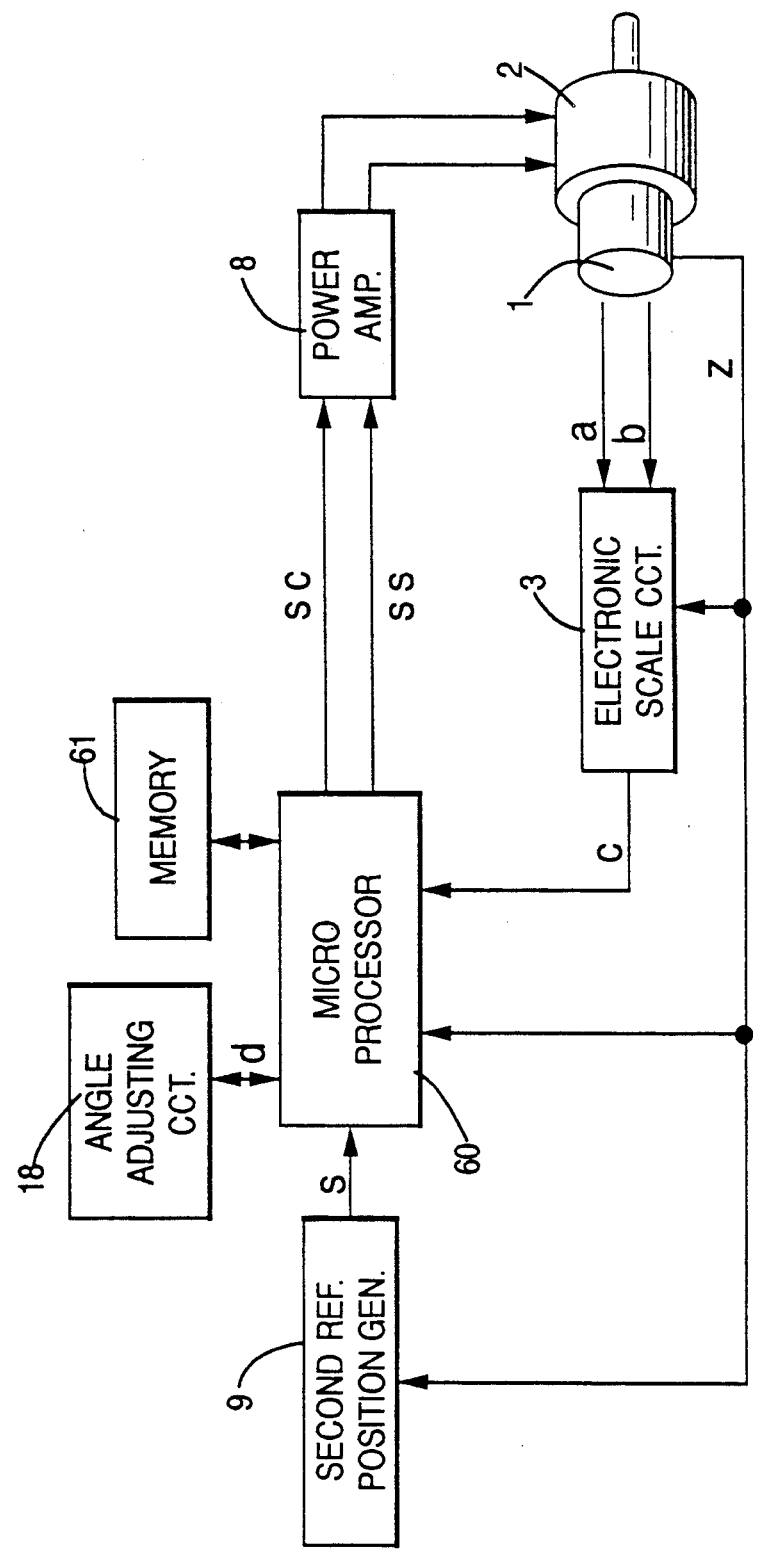
FIG. 11 is a block diagram of the position control system in a fourth embodiment of the present invention.

FIG. 11 is a block diagram showing a fourth embodiment of the position control system of the present invention, which shows the configuration in the case where, of the elements of the third embodiment shown in FIG. 8, the subtracter 5, generating electric angle calculation circuit 6, function generating circuit 7, first reference position generator 10, and address generator 11 are realized by software using the processing unit 60 and the memory 61.

The angle adjusting circuit used in the third embodiment and the fourth embodiment of the position control system as explained above permits correct angle adjustment without respect to the load (such as friction load) of the stepping motor or of the object to be driven by the stepping motor, but, due to the necessity for providing a process for adjusting the relative position between the stepping motor and the encoder in manufacture, it is relatively low in mass productivity. The fifth embodiment to be described hereinafter is the most preferred embodiment in comparison with the foregoing first through fourth embodiments.

Figure 12:
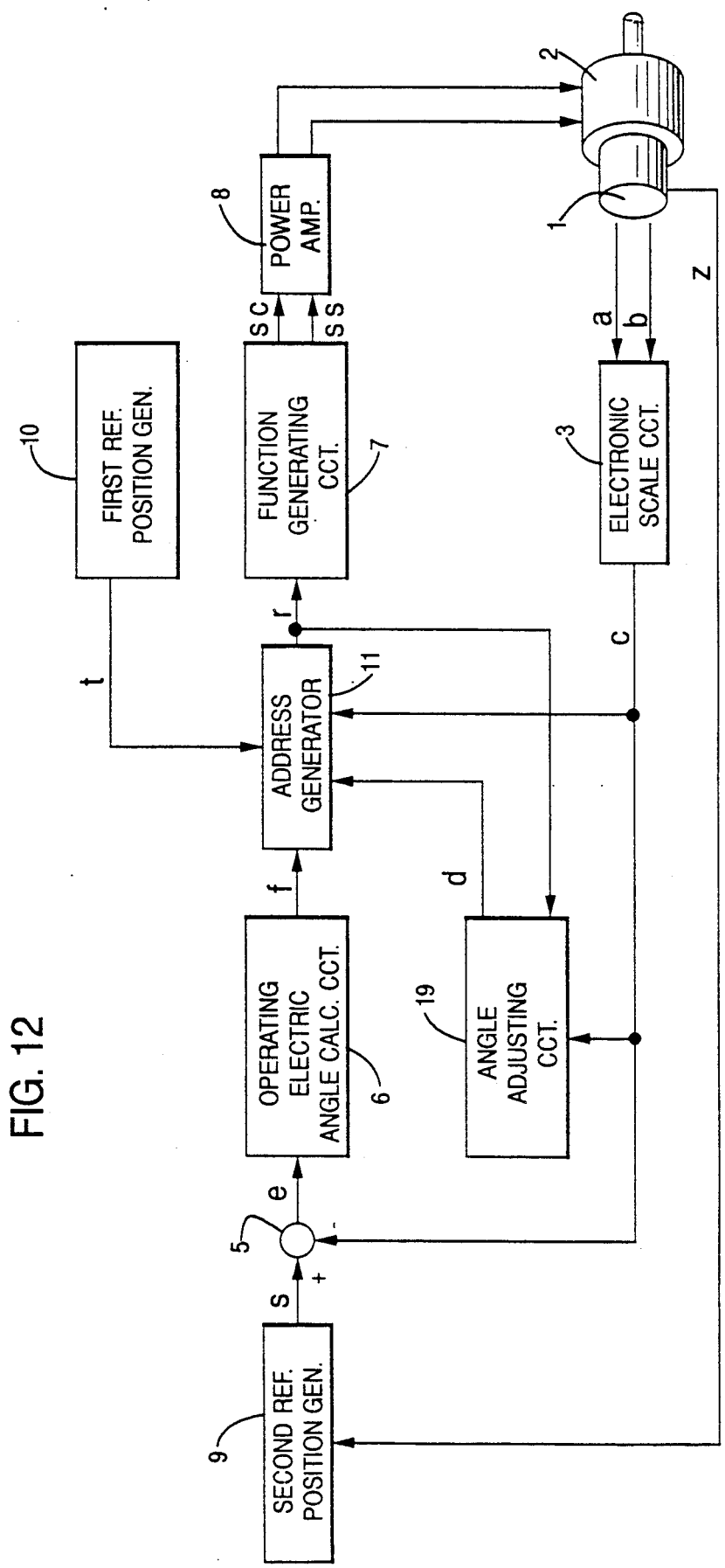
FIG. 12 is a block diagram of the position control system in a fifth embodiment of the present invention.

FIG. 12 is a block diagram showing a fifth embodiment of the position control system of the present invention. In this embodiment, the portion different from the first embodiment shown in FIG. 1 is only the angle adjusting circuit 19, so that the explanation will be limited to that part. The angle adjusting circuit 19 generates an angle adjusting signal d using the current position signal c and the address signal r. By way of a separate drawing, a detailed explanation will be given on the angle adjusting circuit 19 below.

Figure 13A:
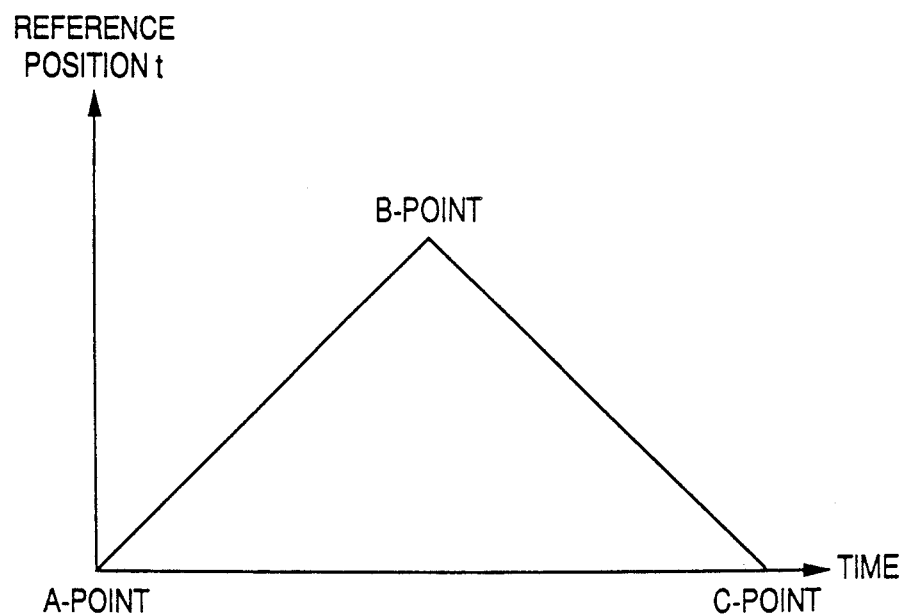
FIG. 13(a) and 13(b) are drawings for illustrating the principle of the angle adjusting circuit.
Figure 13B:
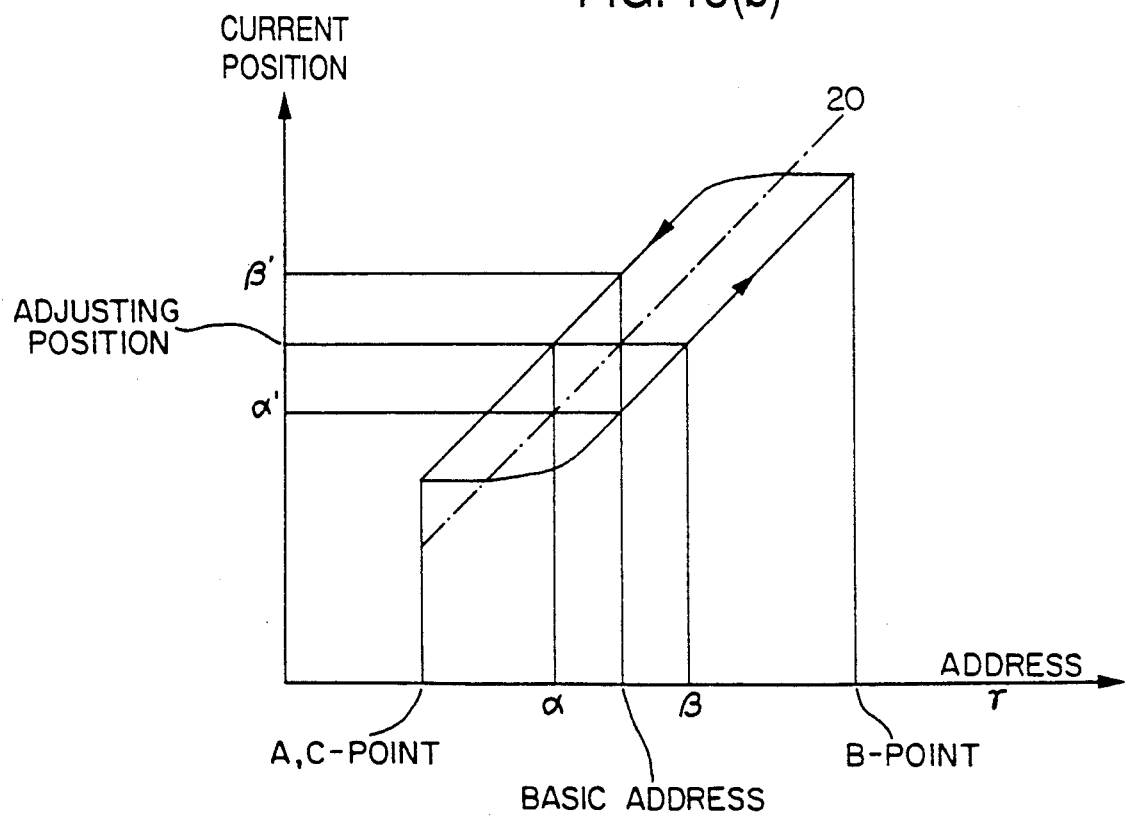

FIG. 13 is a principle drawing for illustrating the principle of the angle adjusting circuit 19 shown in FIG. 12. FIG. 13(a) shows an example of the open loop reference position command t for the of effecting positional error adjustment between the stepping motor 2 and the encoder 1. As shown in the drawings, it is assumed that the open loop reference position command t shows an increase in its value time-proportionally from the point A and a decrease in its value time-proportionally from the B. The relation between the address signal r and the current position signal c shown by the electronic scale circuit 3 when such an open loop reference position command t is given is shown in FIG. 13(b). As to the locus of the current position signal of the stepping motor 2 when reciprocated under the open loop reference position command t, hysterisis loop as shown in this figure is drawn under the effect of the friction load and the magnetic hysterisis of the stepping motor 2. If there is no friction load or magnetic hysterisis, the locus of the current position signal becomes as shown by the dashed line 20. However, as the scales (=resolutions) of the current position signal c and the address signal r are assumed to be identical here, the slope of the dashed line 20 becomes 1. Here, assuming that the sizes of the above friction load and the magnetic hysterisis are constant without depending on the direction of rotation of the stepping motor 2, the reference address has just the central value of the address $\alpha$ and the address $\beta$. Accordingly, in order to obtain the quantity of the angle adjusting signal d, the address $\alpha$ and the address $\beta$ may be obtained.

The angle adjusting signal d is obtainable by such procedures that the stepping motor 2 is rotated to bring the current position signal c in accord with the adjusting position, at which time the addresses $\alpha$ and $\beta$ respectively are outputted and the operation of $d = \alpha + (-\beta - \alpha)/2$ is performed. The angle adjusting signal d thus obtained is used at the time of the closed loop position control.

As the scales (=resolutions) of the current position signal c and the address signal r are made identical here, the angle adjusting signal d may be similarly obtainable by such procedures that the stepping motor 2 is subjected to an open loop position control by the open loop reference position command t shown in FIG. 13(a), and the current positions $\alpha'$ and $\beta'$ when the address signal r at that time comes to coincide with a certain reference address are outputted and the operation of $d=\alpha'+(\beta'-\alpha')/2$ is performed. Further, in the case where the address signal r are different and there is a relation of $r=q\cdot c$, a similar result can be realized by using the product of the address compensating signal d obtained above multiplied by q as the address compensating signal d.

Figure 14:
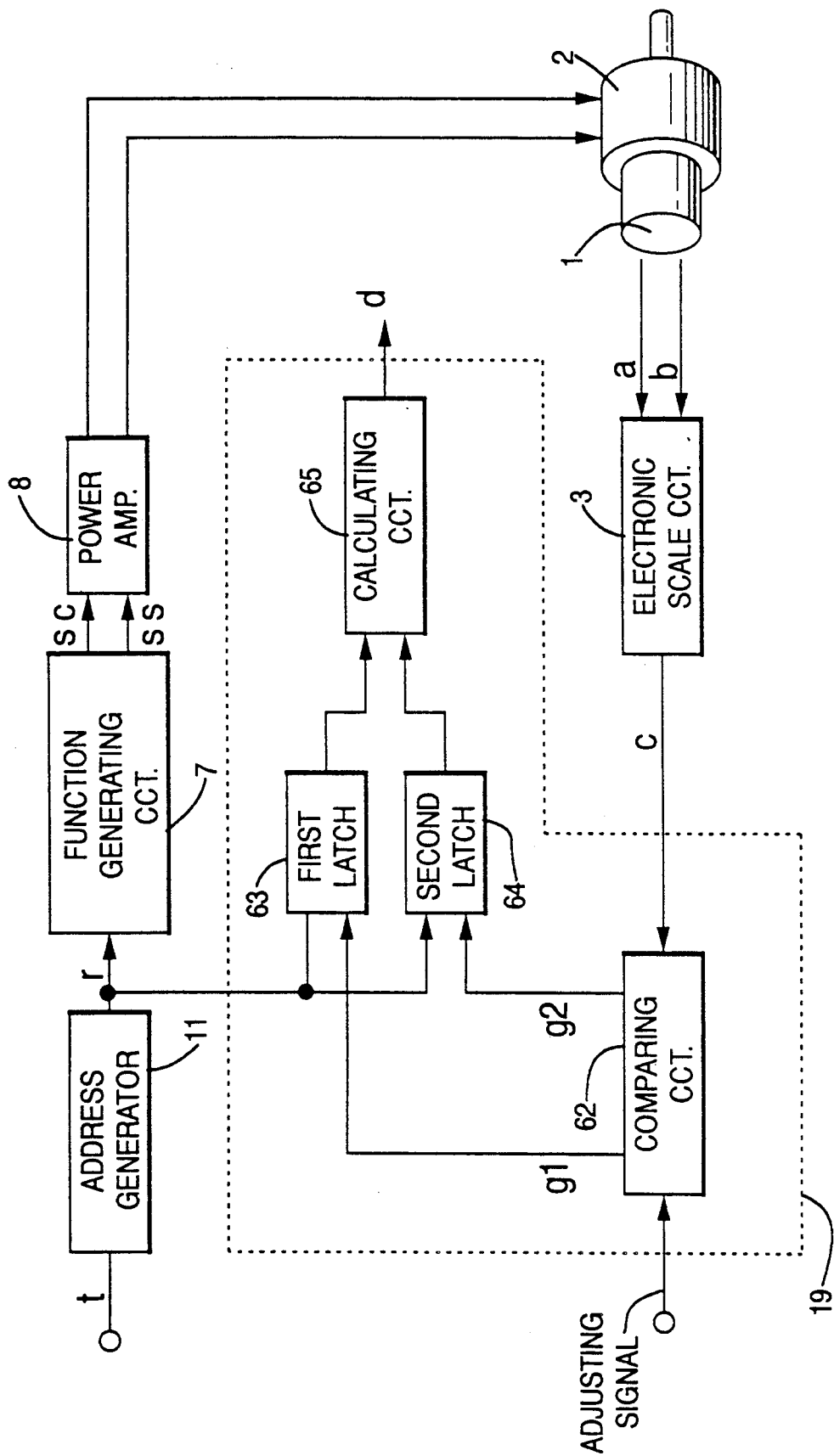
FIG. 14 is a block diagram showing the configuration of an embodiment of the angle adjusting circuit.

FIG. 14 is a block diagram showing the configuration of one embodiment of the angle adjusting circuit 19. The same elements as those shown in FIG. 1 are denoted by the same numbers and explanation thereof is omitted. Also, it is assumed that, as to the open loop reference position command t, the same one as that of FIG. 13(a) is given. When the open loop reference position command t is provided and the stepping motor 2 rotates, the current position signal c varies accordingly. The comparing circuit 62 is configured so that the current position signal c is compared with the adjusting position signal provided in advance with a suitable value, and , when the two values come to coincide, the gate signals g1 and g2 are outputted. However, it is so made that the gate signal g1 is generated in the course of the variation of the open loop reference position command t from the point A to the point B and the gate signal g2 is generated in the course of the variation of the open loop reference position command t from the point B to the point C. By such a configuration, in the first latch 63, the address $\beta$ shown in FIG. 13 (b) is memorized, and in the second latch 64, similarly the address $\alpha$ is memorized. On these memorized addresses $\alpha$ and $\beta$ the calculating circuit 654 provides the operation of $d=\alpha+(\beta-\alpha)/2$. The angle adjusting signal d can thus be automatically detected by the above configuration.

Needless to say, the fifth embodiment of the position control system as explained above can be readily realized by changing the program to be stored in the memory 61 according to the configuration of the second embodiment shown in FIG. 6.

In the first through the fifth embodiments of the position control system, with respect to the encoder 1, stepping motor 2, and electronic scale circuit 3, an explanation was set forth limited to the case of the 2 phase types, but a similar effect can be obtained with 3 or more phase types, respectively.

Further, in the above description, the embodiments of the present invention were explained with the rotary type stepping motor and encoder, but the invention is of course applicable when using a driving source of linear movement such as a linear motor and a linear scale. In the above explanation, it is assumed that the encoder is directly connected with the rotary shaft of the stepping motor, but it may of course be fixed to a moveable means to be driven in accordance with the rotation of the motor.

In the above embodiment, and explanation has been set forth of the case of obtaining a basic position signal z to show the basic position from the encoder 1, but the invention is not limited thereto.

Further, in the above embodiments, an explanation has been set forth such that the function data having a phase difference at 90° to each other to be stored in the ROM in the function generating circuit are to be prepared by the basic 1 pitch portion of the stepping motor. However, with respect to the elements having symmetry such as a sine wave, the system may be realized by taking the function data to be stored in the ROM to be a part of 1 pitch portion and generating the rest by an operation with symmetry taken into consideration.

What is claimed is:

1. A position control system comprising:
   a stepping motor;
   an encoder for producing polyphase signals having different phases from one another according to a rotation of said stepping motor;
   current position signal generating means for generating from said polyphase signals a current position signal indicative of a current position of said stepping motor;
   first reference position generating means for generating an open loop reference position command for subjecting said stepping motor to an open loop position control;
   second reference position generating means for generating a closed loop reference position command for subjecting said stepping motor to a closed loop position control;
   error calculating means for calculating a difference between said closed loop reference position command and said current position signal and for outputting an error signal indicative of the thus calculated difference;
   operating electric angle calculating means for subjecting said error signal to a compensation calculation for said closed loop position control to obtain an operating electric angle signal indicative of a torque angle of said stepping motor;
   angle adjusting means for generating an angle adjusting signal proportional to a torque angle error caused by a positional error between said stepping motor and said encoder;
   control signal generating means for generating a control signal according to said open loop reference position command during said open loop position control, and for generating said control signal according to said operating electric angle signal, said current position signal and said angle adjusting signal during said closed loop position control;
   current command generating means for generating current commands according to said control signal, said current commands each expressed by a predetermined mathematical function, and said current commands being indicative of polyphase currents to be supplied to said stepping motor; and
   driving means responsive to said current commands for generating the polyphase currents and for supplying said polyphase currents to said stepping motor to drive said stepping motor.

2. A position control system according to claim 1, wherein said angle adjusting means comprises:
   means for generating a reference voltage;
   means for converting the reference voltage to an optional voltage; and,
   means for converting the optional voltage to a digital code, the digital code being outputted as said angle adjusting signal.

3. A position control system according to claim 1, wherein said angle adjusting means comprises digital code generating means for generating a digital code representing said angle adjusting signal.

4. A position control system according to claim 3, wherein said digital code generating means comprises:
   a reference voltage source for generating a reference voltage; and a plurality of switching circuits each comprising a serially connected resistor and dip switch, each of the plurality of switching circuits being connected at one end thereof to the reference voltage source and at the other end thereof to a ground, and said digital code is obtained from connecting points between each said resistors and said dip switch.

5. A position control system according to claim 1, wherein said current position signal generating means comprises:
   means for generating a carrier signal;
   modulating means for modulating said carrier signal with said polyphase signals outputted from said encoder to obtain a modulated carrier; and
   demodulating means for demodulating phase information of said modulated carrier to obtain said current position signal.

6. A position control system according to claim 1, wherein said operating electric angle calculating means comprises a differential compensation filter.

7. A position control system according to claim 6, wherein said operating electric angle calculating means further comprises an integral compensation filter for compensating said stepping motor to prohibit a generation of a steady-state deviation in response to said closed loop reference position command.

8. A position control system according to claim 1, wherein said control signal generating means comprises:
   adding means for adding said operating electric angle signal, said current position signal and said angle adjusting signal; and
   means for omitting upper bit data from an output of said adding means.

9. A position control system according to claim 1, wherein said current command generating means comprises memory means containing a plurality of data tables each having current command data representing said predetermined mathematical function, said memory means receiving said control signal from said control signal generating means as an address and outputting a current command from said data tables according to said address.

10. A position control system according to claim 9, wherein said current command data in each of said plurality of data tables represent a sinusoidal function which is different in phase from that represented by said current command data in another of said plurality of data tables.

11. A position control system according to claim 1, wherein said first reference position generating means, said error calculating means, said operating electric angle calculating means, said angle adjusting means and said current command generating means comprise:
   memory means having stored therein a program; and,
   processing means for executing said program stored in said memory means.

12. A position control system comprising:
   a stepping motor;
   an encoder for producing polyphase signals having different phases from one another according to a rotation of said stepping motor;
   current position signal generating means for generating from said polyphase signals a current position signal indicative of a current position of said stepping motor;
   first reference position generating means for generating an open loop reference position command for subjecting said stepping motor to an open loop position control;
   second reference position generating means for generating a closed loop reference position command for subjecting said stepping motor to a closed loop position control;
   error calculating means for calculating a difference between said closed loop reference position command and said current position signal and for outputting an error signal indicative of the thus calculated difference;
   operating electric angle calculating means for subjecting said error signal to a compensation calculation for said closed loop position control to obtain an operating electric angle signal indicative of a torque of said stepping motor;
   angle adjusting means for subjecting said stepping motor to reciprocal movements during said open loop position control using said open loop reference position command to detect a torque angle error caused by a positional error between said stepping motor and said encoder, and for generating an angle adjusting signal proportional to said torque angle error;
   control signal generating means for generating a control signal according to said open loop reference position command during said open loop position control and for generating said control signal according to said operating electric angle signal, said current position signal and said angle adjusting signal during said closed loop position control;
   current command generating means for generating current commands according to said control signal, said current commands each expressed by a predetermined mathematical function, and said current commands being indicative of polyphase currents to be supplied to said stepping motor; and
   driving means responsive to said current commands for generating said polyphase currents and for supplying said polyphase currents to said stepping motor to drive said stepping motor.

13. A position control system according to claim 12, wherein said angle adjusting means comprises:
   comparing means for comparing said current position signal with a predetermined adjusting position signal when said stepping motor is subjected to reciprocal movements during said open loop position control using said open loop reference position command, said comparing means generating a first gate signal when said current position signal becomes equal to said predetermined adjusting position signal during a forward movement of said stepping motor and a second gate signal when said current position signal becomes equal to said predetermined adjusting position signal during a reverse movement of said stepping motor;
   first memory means responsive to said first gate signal for storing therein said control signal at a time when said current position signal becomes equal to said predetermined adjusting position signal during forward movement of said stepping motor;
   second memory means responsive to said second gate signal for storing therein said control signal at a time when said current position signal becomes equal to said predetermined adjusting position signal during said reverse movement of said stepping motor; and means for calculating a difference between contents of said first and second memory means and for dividing the thus calculated difference by 2 to produce said angle adjusting signal.

14. A position control system according to claim 12, wherein said angle adjusting means comprises:
comparing means for comparing said current position signal with a predetermined adjusting control signal when said stepping motor is subjected to reciprocal movements during said open loop position control using said open loop reference position command, said comparing means generating a first gate signal when said control signal becomes equal to said predetermined adjusting position signal during a forward movement of said stepping motor and a second gate signal when said control signal becomes equal to said predetermined adjusting control signal during a reverse movement of said stepping motor;
first memory means responsive to said first gate signal for storing therein said current position signal at a time when said control signal becomes equal to said predetermined adjusting control signal during forward movement of said stepping motor;
second memory means responsive to said second gate signal for storing therein said current position signal at a time when said control signal becomes equal to said predetermined adjusting control signal during said reverse movement of said stepping motor; and
means for calculating a difference between contents of said first and second memory means and for dividing the thus calculated difference by 2 to produce said angle adjusting signal.

15. A position control system according to claim 14, wherein said angle adjusting means further comprises means for multiplying said calculated difference by a predetermined coefficient to produce said angle adjusting signal.

16. A position control system according to claim 12, wherein said current position signal generating means comprises:
means for generating a carrier signal;
modulating means for modulating said carrier signal with said polyphase signals outputted from said encoder to obtain a modulated carrier; and
demodulating means for demodulating phase information of modulated carrier to obtain said current position signal.

17. A position control system according to claim 12, wherein said operating electric angle calculating means comprises a differential compensation filter.

18. A position control system according to claim 17, wherein said operating electric angle calculating means further comprises an integral compensation filter for compensating said stepping motor to prohibit generation of a steady-state deviation in response to said closed loop reference position command.

19. A position control system according to claim 12, wherein said control signal generating means comprises:
adding means for adding said operating electric angle signal, said current position signal and said angle adjusting signal; and
means for omitting upper bit data from an output of said adding means.

20. A position control system to claim 12, wherein said current command generating means comprises memory means containing a plurality of data tables each having current command data representing said predetermined mathematical function, said memory means receiving said control signal from said control signal generating means as an address and outputting a current command from said data tables according to said address.

21. A position control system according to claim 20, wherein said current command data in each of the plurality of data tables represent a sinusoidal function which is different in phase from that represented by said current command data in another of said plurality of data tables.

22. A position control system according to claim 12, wherein said first reference position generating means, said error calculating means, said operating electric angle calculating means, said angle adjusting means, and said current command generating means comprise:
memory means having stored therein a program; and
processing means for executing said program stored in said memory means.

* * * * *